US009201544B2

(12) United States Patent
Hwang et al.

(10) Patent No.: US 9,201,544 B2
(45) Date of Patent: Dec. 1, 2015

(54) DISPLAY DRIVING CIRCUIT WITH PHOTO DETECTING INPUT

(71) Applicant: Integrated Digital Technologies, Inc., Hsinchu (TW)

(72) Inventors: Naejye Hwang, Hsinchu (TW); Shen-Tai Liaw, Hsinchu (TW); Yang-Hui Chang, Hsinchu County (TW)

(73) Assignee: Integrated Digital Technologies, Inc., Hsinchu Science Park, Hsinchu (TW)

( * ) Notice: Subject to any disclaimer, the term of this patent is extended or adjusted under 35 U.S.C. 154(b) by 0 days.

(21) Appl. No.: 14/084,620

(22) Filed: Nov. 20, 2013

(65) Prior Publication Data

US 2014/0139489 A1     May 22, 2014

Related U.S. Application Data

(60) Provisional application No. 61/728,242, filed on Nov. 20, 2012.

(51) Int. Cl.
    *G06F 3/042*      (2006.01)
    *G02F 1/133*      (2006.01)
    *G09G 5/00*      (2006.01)

(52) U.S. Cl.
CPC ............... *G06F 3/042* (2013.01); *G02F 1/133* (2013.01); *G06F 3/0421* (2013.01); *G09G 5/00* (2013.01); *G02F 2001/13312* (2013.01)

(58) Field of Classification Search
CPC .................... G06F 3/042–3/0421; G09G 5/00; G02F 2001/13312; G02F 1/133

USPC ................................ 345/173–178; 178/18.09
See application file for complete search history.

(56) References Cited

U.S. PATENT DOCUMENTS

| 7,323,718 | B2 * | 1/2008 | Chen et al. ....................... 257/72 |
| 7,742,041 | B2 * | 6/2010 | Lee et al. ........................ 345/173 |
| 7,889,183 | B2 * | 2/2011 | Lee et al. ........................ 345/173 |
| 8,325,155 | B2 | 12/2012 | Chang |
| 8,345,173 | B2 * | 1/2013 | Cho ................................ 349/12 |
| 8,368,656 | B2 * | 2/2013 | Wang et al. .................... 345/173 |
| 8,368,677 | B2 * | 2/2013 | Yamamoto ..................... 345/207 |
| 8,497,835 | B2 * | 7/2013 | Kim .............................. 345/107 |

(Continued)

FOREIGN PATENT DOCUMENTS

| JP | 2008304900 A | 12/2008 |
| JP | 2010245078 A | 10/2010 |

(Continued)

*Primary Examiner* — Dmitriy Bolotin
(74) *Attorney, Agent, or Firm* — Winston Hsu; Scott Margo (57) ABSTRACT

A display driving circuit with photo detecting input includes pixel regions, pixel electrodes, gate lines, data lines, at least one photo detecting unit, at least one readout line and at least one isolation electrode. The pixel regions are aligned in a matrix configuration. The pixel electrodes are disposed in the pixel region respectively. Each of the gate lines extends along a first direction and the gate lines are disposed parallel to one another. Each of the data lines extends along a second direction and the data lines are disposed parallel to one another. The gate lines cross the data lines. The photo detecting unit is at least partially disposed in one of the pixel region and electrically connected to the readout line. The readout line is disposed between two adjacent data lines. The isolation electrode is disposed between the readout line and one of the data lines.

7 Claims, 7 Drawing Sheets

(56) References Cited

U.S. PATENT DOCUMENTS

| | | | |
|---|---|---|---|
| 2003/0076295 A1* | 4/2003 | Nakajima | 345/156 |
| 2003/0156087 A1* | 8/2003 | Boer et al. | 345/92 |
| 2003/0179323 A1* | 9/2003 | Abileah et al. | 349/24 |
| 2004/0113877 A1* | 6/2004 | Abileah et al. | 345/92 |
| 2005/0275616 A1* | 12/2005 | Park et al. | 345/102 |
| 2006/0077186 A1* | 4/2006 | Park et al. | 345/173 |
| 2006/0119590 A1* | 6/2006 | Park et al. | 345/175 |
| 2007/0109239 A1* | 5/2007 | den Boer et al. | 345/87 |
| 2007/0187720 A1* | 8/2007 | Park et al. | 257/206 |
| 2007/0257259 A1* | 11/2007 | Chen et al. | 257/59 |
| 2008/0062156 A1* | 3/2008 | Abileah et al. | 345/204 |
| 2008/0121442 A1* | 5/2008 | Boer et al. | 178/18.09 |
| 2008/0174706 A1* | 7/2008 | Kwon et al. | 349/12 |
| 2010/0315377 A1 | 12/2010 | Chang | |
| 2011/0169772 A1* | 7/2011 | Liu et al. | 345/175 |
| 2011/0175846 A1* | 7/2011 | Wang et al. | 345/174 |
| 2011/0216023 A1* | 9/2011 | Kurokawa et al. | 345/173 |
| 2011/0310036 A1 | 12/2011 | Juan | |
| 2012/0056835 A1* | 3/2012 | Choo et al. | 345/173 |
| 2012/0092302 A1* | 4/2012 | Imai et al. | 345/175 |
| 2012/0139866 A1* | 6/2012 | Jung et al. | 345/174 |
| 2012/0241768 A1* | 9/2012 | Murai et al. | 257/84 |
| 2012/0268356 A1* | 10/2012 | Kim et al. | 345/84 |
| 2014/0015801 A1* | 1/2014 | Chung et al. | 345/175 |

FOREIGN PATENT DOCUMENTS

| | | |
|---|---|---|
| KR | 1020090095890 A | 9/2009 |
| KR | 1020100069901 A | 6/2010 |
| KR | 1020110100954 A | 9/2011 |
| TW | 200743886 | 12/2007 |
| TW | 201100917 | 1/2011 |

\* cited by examiner

DISPLAY DRIVING CIRCUIT WITH PHOTO DETECTING INPUT

CROSS REFERENCE TO RELATED APPLICATIONS

This application claims the benefit of U.S. provisional application Ser. No. 61/728,242, filed Nov. 20, 2012.

BACKGROUND OF THE INVENTION

1. Field of the Invention

The present invention generally relates to a display driving circuit, and more particularly, to a display driving circuit with photo detecting input.

2. Description of the Prior Art

In recent years, touch sensing technologies have developed flourishingly, and electronic products, such as mobile phones, tablet PCs, GPS navigator systems, laptop PCs, and desktop PCs, which have both the touch sensing function and the display function, are commercialized accordingly. In the electronic products mentioned above, display regions of touch panels are mainly equipped with touch sensing functions. In other words, the display panels are replaced by the touch display panels. According to differences in structure designs, the touch display panels may include an out-cell type touch display panel, an in-cell type touch display panel, and an on-cell type touch display panel. In the out-cell type touch display panel, an independent touch panel is attached to a normal display panel. In the in-cell type touch display panel and the on-cell type touch display panel, touch sensing devices are disposed directly on an inner surface or an outer surface of a substrate in the display panel. For example, the touch sensing devices may be disposed on a color filter substrate or a thin film transistor array substrate of the traditional display panel so as to form the in-cell type touch display panel.

Figure 1:
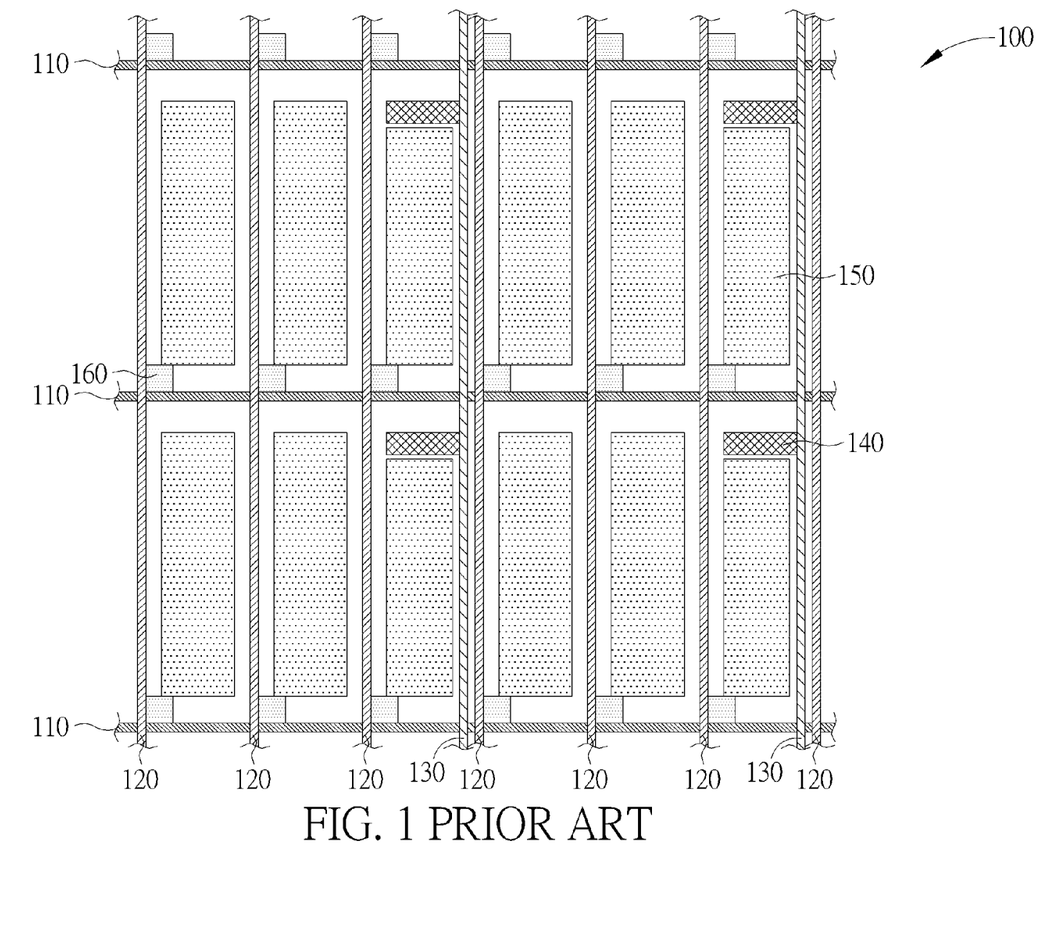
FIG. 1 is a schematic diagram illustrating a conventional display driving circuit with photo detecting input.

Please refer to FIG. 1. FIG. 1 is a schematic diagram illustrating a conventional display driving circuit 100 with photo detecting input. The display driving circuit 100 is generally disposed on an array substrate. The display driving circuit 100 includes photo detecting units 140, corresponding readout lines 130 and other general components of display driving circuits such as display switching devices 160, gate lines 110 and data lines 120 crossing the gate lines 110. The photo detecting units 140 are employed to perform touch sensing functions, and the readout lines 130 are used to transmit photo detecting signals. In the conventional design, the readout line 130 is disposed adjacently to one of the data lines 120 and substantially parallel to the data lines 120. The photo detecting signals transmitted by the readout lines 130 tend to be interfered by display signals transmitted via the data lines 120. Calculations and judgment about the photo detecting signals may be influenced accordingly, the signal processing may become more complicated, and the processing loading of the related integrated circuits may be increased.

SUMMARY OF THE INVENTION

It is one of the objectives of the present invention to provide a display driving circuit with photo detecting input. An isolation electrode is disposed between a readout line and a data line so as to reduce signal interference between the readout line and the data line, and purposes of enhancing accuracy of photo detecting signal judgment and lowering the processing loading of the related integrated circuits may be achieved accordingly.

To achieve the purposes described above, a preferred embodiment of the present invention provides a display driving circuit with photo detecting input. The display driving circuit includes a plurality of pixel regions, a plurality of pixel electrodes, a plurality of gate lines, a plurality of data lines, at least one photo detecting unit, at least one readout line and at least one isolation electrode. The pixel regions are arranged in a matrix configuration. The pixel electrodes are disposed in the pixel regions respectively. The gate lines extend along a first direction and are disposed parallel to one another. The data lines extend along a second direction and are disposed parallel to one another. The gate lines cross the data lines. The photo detecting unit is disposed in at least one of the pixel regions. The readout line is electrically connected to the photo detecting unit. The readout line is disposed between two adjacent data lines. The isolation electrode is disposed between the readout line and one of the data lines along the first direction.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the term "include" is used in an open-ended fashion, and thus should be interpreted to mean "include, but not limited to . . . " In addition, the phrase "electrically connected to" or "structurally connected to" in this document includes direct or indirect connection approaches. Therefore, "a first device is connected to the second device" in this document means that "the first device is directly connected to the second device" or "the first device is connected to the second device via other devices or indirectly connected to the second device by other approaches".

Figure 2:
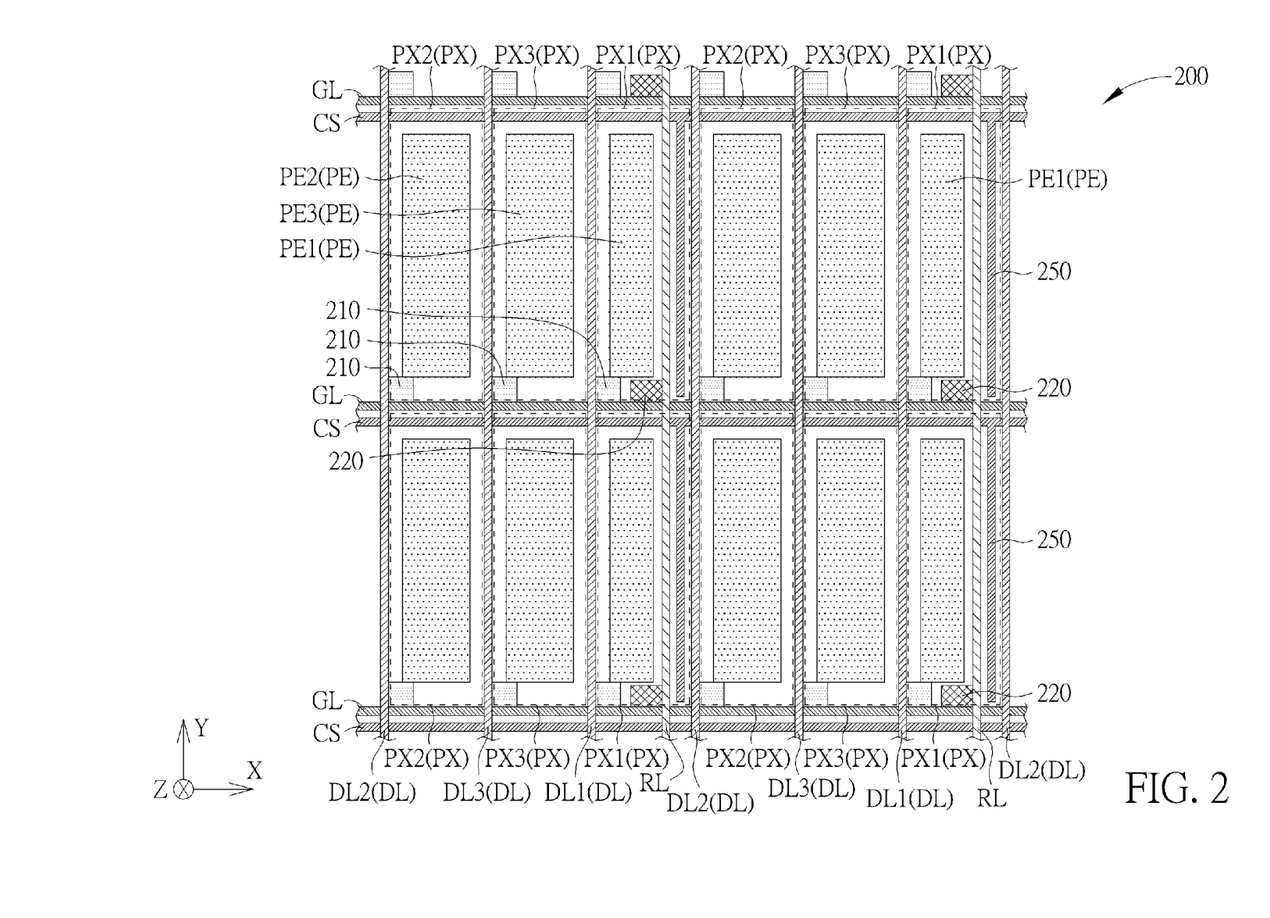
FIG. 2 is a schematic diagram illustrating a display driving circuit with photo detecting input according to a first preferred embodiment of the present invention.

Please refer to FIG. 2. FIG. 2 is a schematic diagram illustrating a display driving circuit with photo detecting input according to a first preferred embodiment of the present invention. Please note that the figures are only for illustration and the figures may not be to scale. The scale may be further modified according to different design considerations. As shown in FIG. 2, a display driving circuit 200 with photo detecting input is provided in this embodiment. The display driving circuit 200 includes a plurality of pixel regions PX, a plurality of pixel electrodes PE, a plurality of gate lines GL, a plurality of data lines DL, at least one photo detecting unit 220, at least one readout line RL and at least one isolation electrode 250. The pixel regions PX are arranged in a matrix configuration. The pixel electrodes PE are disposed in the pixel regions PX respectively. The gate lines GL extend along a first direction X and are disposed parallel to one another. The data lines DL extend along a second direction Y and are disposed parallel to one another. The gate lines GL cross the data lines DL. In this embodiment, the first direction X is perpendicular to the second direction Y preferably, but not limited thereto. In addition, the pixel regions PX arranged in a matrix configuration are substantially defined by the crossed gate lines GL and data lines DL preferably, but not limited thereto. The photo detecting unit 220 is disposed in at least one of the pixel regions PX. The readout line RL is electrically connected to the photo detecting unit 220 so as to receive and transmit signals generated by the photo detecting unit 220 for calculating photo sensing results. The photo detecting unit 220 in the present invention may include at least one photo sensing device such as a photo sensing transistor preferably, but not limited thereto. It is worth noting that the photo detecting unit 220 in the present invention may simply be used as an ambient light sensor for detecting conditions and variations of ambient light, and the display driving circuit 200 may also include a plurality of photo detecting units 220 disposed and arranged in a specific manner for performing touch point positioning functions or image array functions. In this embodiment, the readout line RL is disposed between two adjacent data lines DL, and the isolation electrode 250 is disposed between the readout line RL and one of the data lines DL so as to reduce signal interference between the readout line RL and the data line DL, and purposes of enhancing accuracy of photo detecting signal judgment and lowering the processing loading of the related integrated circuits may be achieved accordingly.

More specifically, as shown in FIG. 2, the data lines DL in this embodiment may include a first data line DL1 and a second data line DL2 disposed adjacently to each other, and none of the data lines DL is disposed between the first data line DL1 and the second data line DL2. The readout line RL is disposed between the first data line DL1 and the second data line DL2 and parallel to the data lines DL preferably. In other words, the readout line RL is substantially perpendicular to the gate lines GL preferably, but not limited thereto. Additionally, a distance between the first data line DL1 and the readout line RL is preferably wider than a distance between the second data line DL2 and the readout line RL. In other words, the readout line RL is closer to the second data line DL2, and the isolation electrode 250 is disposed between the readout line RL and the second data line DL2 along the first direction X so as to reduce signal interference between the readout line RL and the second data line DL2. The accuracy of judging the signals generated by the photo detecting unit 220 may be enhanced, and the processing loading of the related integrated circuits may be lowered.

As shown in FIG. 2, the display driving circuit 200 with the photo detecting input in this embodiment may further include a plurality of display switching devices 210 disposed in the pixel regions PX respectively. Each of the display switching devices 210 is electrically connected to one of the gate lines GL, one of the data lines DL and one of the pixel electrodes PE. In this embodiment, the pixel regions PX may include a first pixel region PX1, a second pixel region PX2 and a third pixel region PX3 aligned alternately along the first direction X. The pixel electrodes PE may include a first pixel electrode PE1, a second pixel electrode PE2 and a third pixel electrode PE3. The first pixel electrode PE1, the second pixel electrode PE2 and the third pixel electrode PE3 are disposed in the first pixel region PX1, the second pixel region PX2 and the third pixel region PX3 respectively. In other words, the first pixel electrode PE1 and the second pixel electrode PE2 are disposed adjacently to each other along the first direction X. The first pixel electrode PE1, the second pixel electrode PE2 and the third pixel electrode PE3 are disposed and aligned alternately along the first direction X. In addition, the data lines DL may further include at least one third data line DL3 disposed adjacently to the second data line DL2 along the first direction X. The first data line DL1, the second data line DL2 and the third data line DL3 are electrically connected to the display switching devices 210 in the first pixel region PX1, the second pixel region PX2 and the third pixel region PX3 respectively, and data signals may then be transmitted to the display switching devices 210 in the pixel regions PX. It is worth noting that the first pixel region PX1, the second pixel region PX2 and the third pixel region PX3 may be used to present blue light, red light and green light respectively by employing corresponding color filters (not shown) or organic light emitting devices, and the different colors may be mixed to present a full color display effect. The photo detecting unit 220 in this embodiment is disposed in the first pixel region PX1 presenting blue light, but the present invention is not limited thereto. In other preferred embodiments of the present invention, the photo detecting unit 220 may also be disposed in other pixel regions PX or even disposed in all pixel regions PX according to different design considerations.

Figure 3:
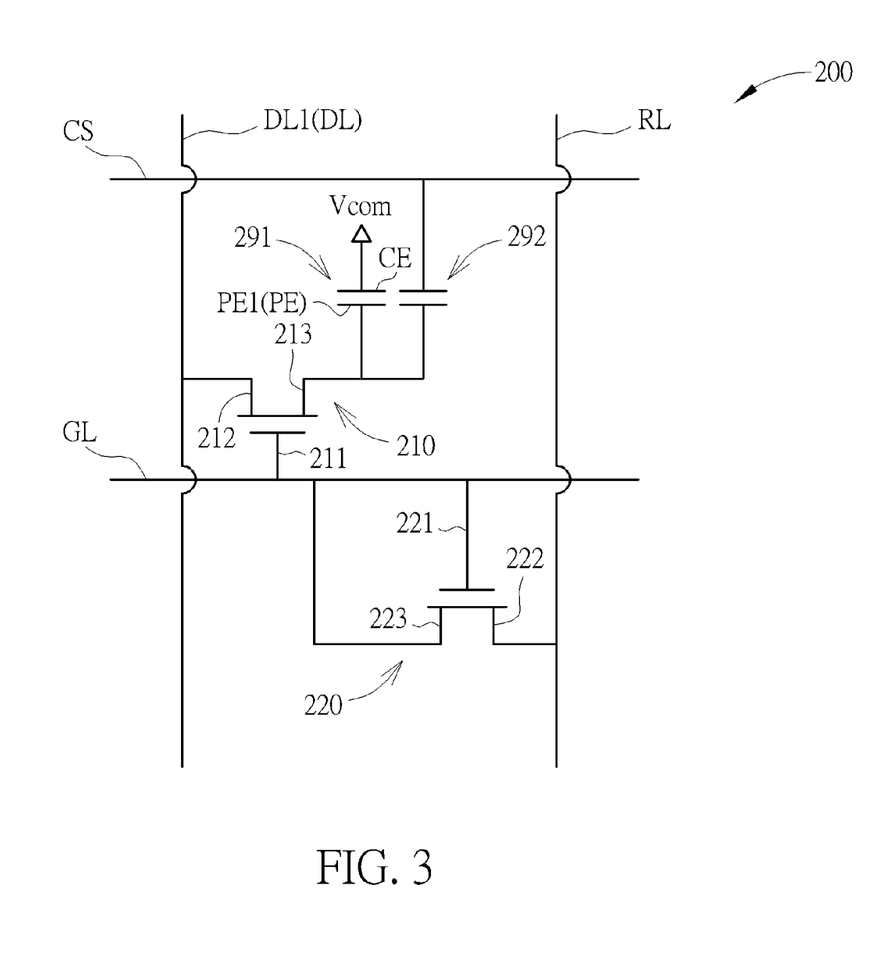
FIG. 3 is a schematic diagram illustrating an equivalent circuit of the display driving circuit in the first preferred embodiment of the present invention.

Please refer to FIG. 2 and FIG. 3. FIG. 3 is a schematic diagram illustrating an equivalent circuit of the display driving circuit in this embodiment. As shown in FIG. 2 and FIG. 3, the display driving circuit 200 with the photo detecting input in this embodiment may further include a plurality of common lines CS extending along the first direction X and disposed parallel to one another. Each of the display switching devices 210 may include a transistor including a gate electrode 211, a source electrode 212 and a drain electrode 213. The gate electrode 211 of the display switching device 210 is connected to one of the gate lines GL, and the source electrode 212 is connected to one of the data lines DL. A coupling capacitor 291 is formed by a common electrode CE with common voltage Vcom, the pixel electrode PE and a material such as a liquid crystal material (not shown) disposed between the common electrode CE and the pixel electrode PE. A storage capacitor 292 is formed by the drain electrode 213, the common line CS and a material such as a dielectric material (not shown) disposed between the drain electrode 213 and the common line CS. Additionally, the photo detecting unit 220 in this embodiment may include a photo sensing TFT including a gate electrode 221, a source electrode 222 and a drain electrode 223. A semiconductor layer such as an amorphous silicon layer, which may generate light beam induced current, in the photo sensing TFT may be used to detect ambient light and measure intensity of the ambient light. It is worth noting that the gate electrode 221 of the photo detecting unit 220 is connected to one of the gate lines GL, and the drain electrode 223 of the photo detecting unit 220 is also connected to the gate line GL and thus is short-circuited to the gate electrode 221. Additionally, the common lines CS are perpendicular to the readout line RL, and the source electrode 222 of the photo detecting unit 220 is connected to the readout line RL. When an optical signal is detected by the photo detecting unit 220, the photo detecting unit 220 generates a current provided to a calculation integrated circuit (not shown) via the readout line RL. Therefore, the display switching device 210 of the display driving circuit 200 may be used to control the content to be display. In addition, the photo detecting unit 220 serves to detect an input optical signal provided from a light source such as a light pen or torch, or light variations caused by the shadow of an object such as a stylus or fingertip or intensity of reflection generated from the object, and take the input optical signal as an input control signal. Thus, the display driving circuit 200 displays and also allows input control via photo sensing. It is worth noting that the isolation electrode 250 in this embodiment is electrically connected to one of the common lines CS preferably. Signals transmitted from the common line CS to the isolation electrode 250 may be used to reduce signal interference between the readout line RL and the second data line DL2. The accuracy of judging the signals generated by the photo detecting unit 220 may be enhanced, and the processing loading of the related integrated circuits may be lowered. In addition, the isolation electrode 250 and the common line CS are formed by one identical manufacturing process and monolithically formed preferably, and no additional process is required to form the isolation electrode 250, but the present invention is not limited to this.

The following description will detail the different embodiments of the present invention. To simplify the description, identical components in each of the following embodiments are marked with identical symbols. For making it easier to understand the differences between the embodiments, the following description will detail the dissimilarities among different embodiments and the identical features will not be redundantly described.

Figure 4:
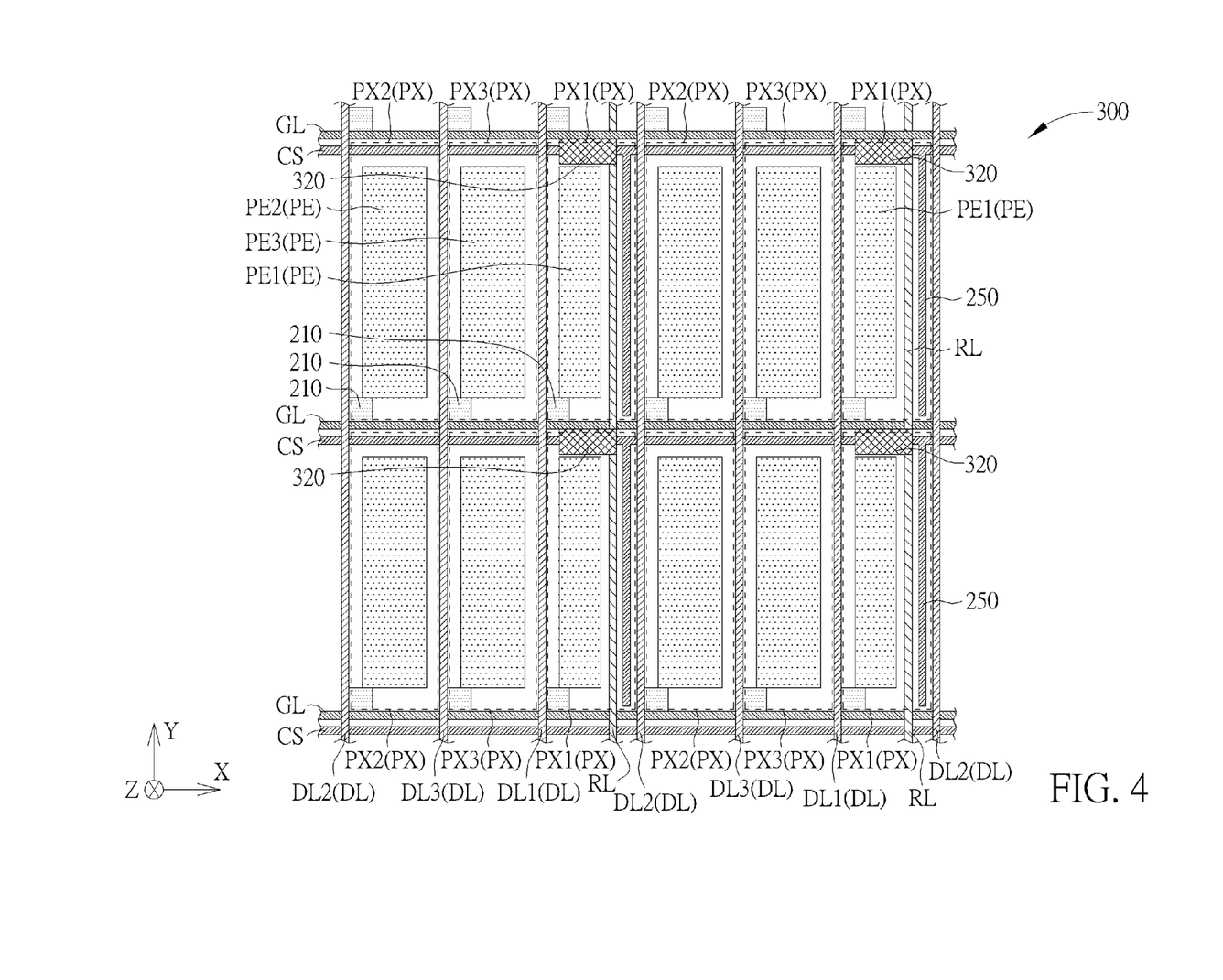
FIG. 4 is a schematic diagram illustrating a display driving circuit with photo detecting input according to a second preferred embodiment of the present invention.
Figure 5:
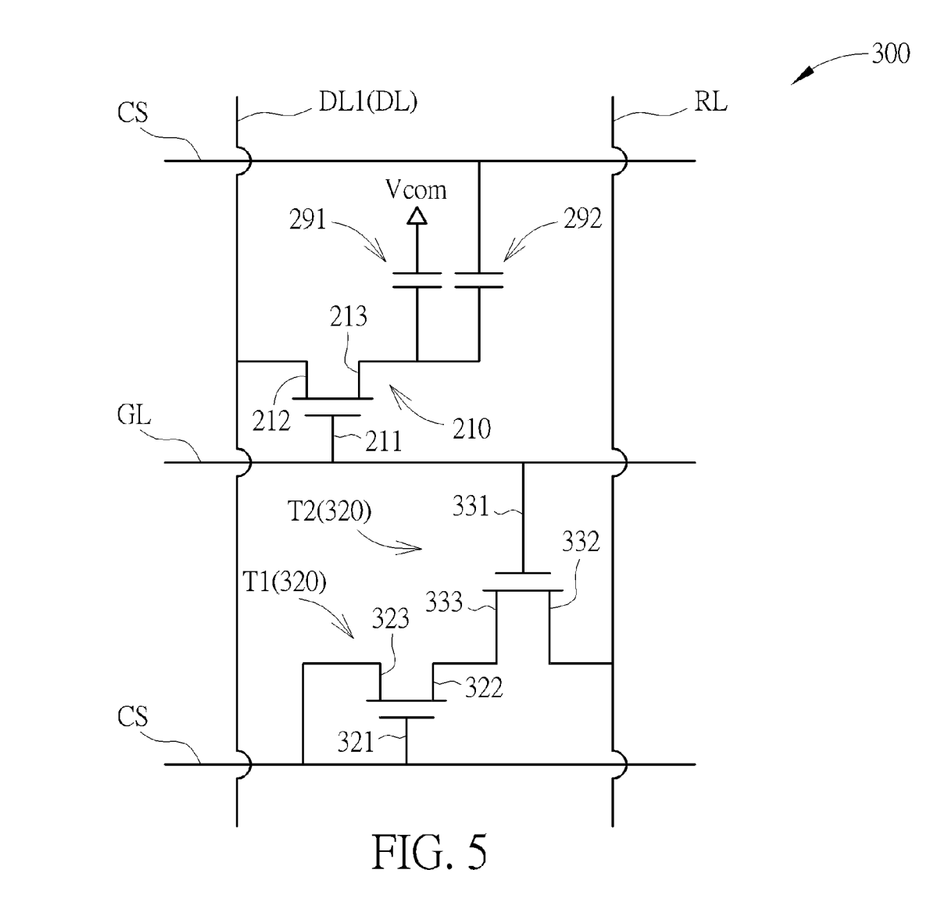
FIG. 5 is a schematic diagram illustrating an equivalent circuit of the display driving circuit in the second preferred embodiment of the present invention.

Please refer to FIG. 4 and FIG. 5. FIG. 4 is a schematic diagram illustrating a display driving circuit with photo detecting input according to a second preferred embodiment of the present invention. FIG. 5 is a schematic diagram illustrating an equivalent circuit of the display driving circuit in this embodiment. As shown in FIG. 4 and FIG. 5, a display driving circuit 300 with photo detecting input is provided in this embodiment. The display driving circuit 300 includes a plurality of pixel regions PX, a plurality of pixel electrodes PE, a plurality of gate lines GL, a plurality of data lines DL, a plurality of common lines CS, at least one photo detecting unit 320, at least one readout line RL and at least one isolation electrode 250. The photo detecting unit 320 is disposed in at least one of the pixel regions PX, and the photo detecting unit 320 is electrically connected to one of the gate lines GL. The readout line RL is electrically connected to the photo detecting unit 320 so as to receive and transmit signals generated by the photo detecting unit 320 for calculating photo sensing results. The difference between the display driving circuit 300 in this embodiment and the display driving circuit in the first preferred embodiment is that the photo detecting unit 320 is electrically connected to one of the common lines CS. More specifically, the photo detecting unit 320 may include a photo sensing transistor T1 and a switch transistor T2. The switch transistor T2 is connected to the photo sensing transistor T1 so as to control the photo sensing transistor T1 to be turned on or turned off. A gate electrode 321 of the photo sensing transistor T1 is connected to one of the common lines CS, and a drain electrode 323 of the photo sensing transistor T1 is also connected to the identical common line CS and thus is short-circuited to the gate electrode 321. In addition, a gate electrode 331 of the switch transistor T2 is connected to one of the gate lines GL, a source electrode 332 of the switch transistor T2 is connected to readout line RL, and a drain electrode 333 of the switch transistor T2 is connected to the source electrode 322 of the photo sensing transistor T1. When the photo sensing transistor T1 detects an input optical signal provided from, for example, a light source such as a light pen or torch, or light variations caused by the shadow of an object such as a stylus or fingertip or intensity of reflection generated from the object, and the gate line GL is selected, which turns on the switch transistor T2, the current generated by the photo sensing transistor T1 will be provided to the readout line RL. Additionally, in this embodiment, the display switching device 210 and the switch transistor T2 may be connected to one identical gate line GL. The display switching device 210 and the switch transistor T2 connected to the same gate line GL may be turned on or turned off together. The photo detecting units 320 connected to one identical readout line RL may be turned on to detect optical signals at different time points, the position of the optical signal may be calculated along the second direction Y, and the multiple touch points sensing function may be realized accordingly.

Figure 6:
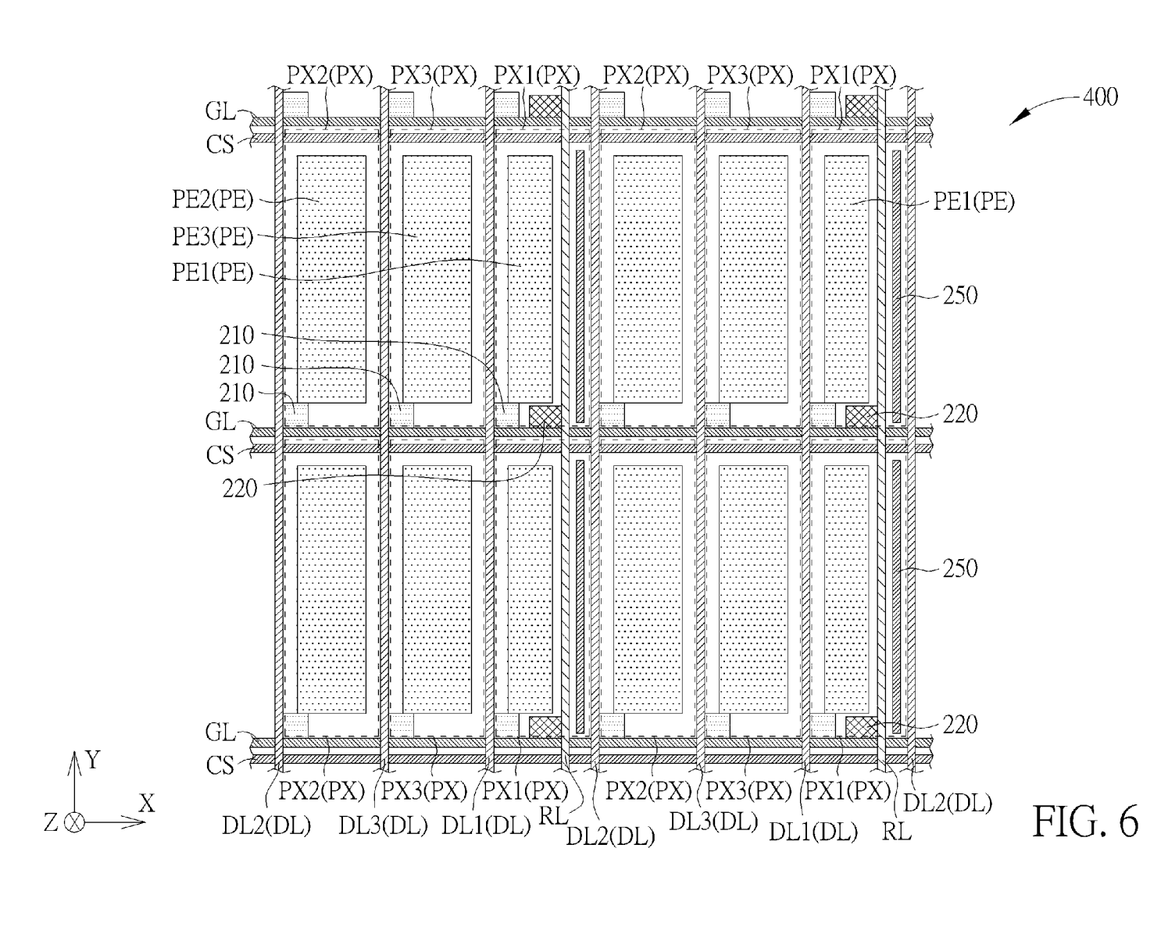
FIG. 6 is a schematic diagram illustrating a display driving circuit with photo detecting input according to a third preferred embodiment of the present invention.

Please refer to FIG. 6. FIG. 6 is a schematic diagram illustrating a display driving circuit 400 with photo detecting input according to a third preferred embodiment of the present invention. As shown in FIG. 6, the difference between the display driving circuit 400 in this embodiment and the display driving circuit in the first preferred embodiment is that the isolation electrode 250 is an electrically floating electrode. In other words, the isolation electrode 250 is electrically insulated from the common lines CS, the gate lines GL, the data lines DL and the readout line RL. It is worth noting that the isolation electrode 250 and the data lines DL may be formed by one identical manufacturing process preferably, or the isolation electrode 250, the gate lines GL and the common lines CS may also be formed by one identical manufacturing process so as to simplify the manufacturing processes, but not limited thereto. The electrically floating isolation electrode 250 is used to reduce signal interference between the readout line RL and the second data line DL2. The accuracy of judging the signals generated by the photo detecting unit 220 may be enhanced, and the processing loading of the related integrated circuits may be lowered.

Figure 7:
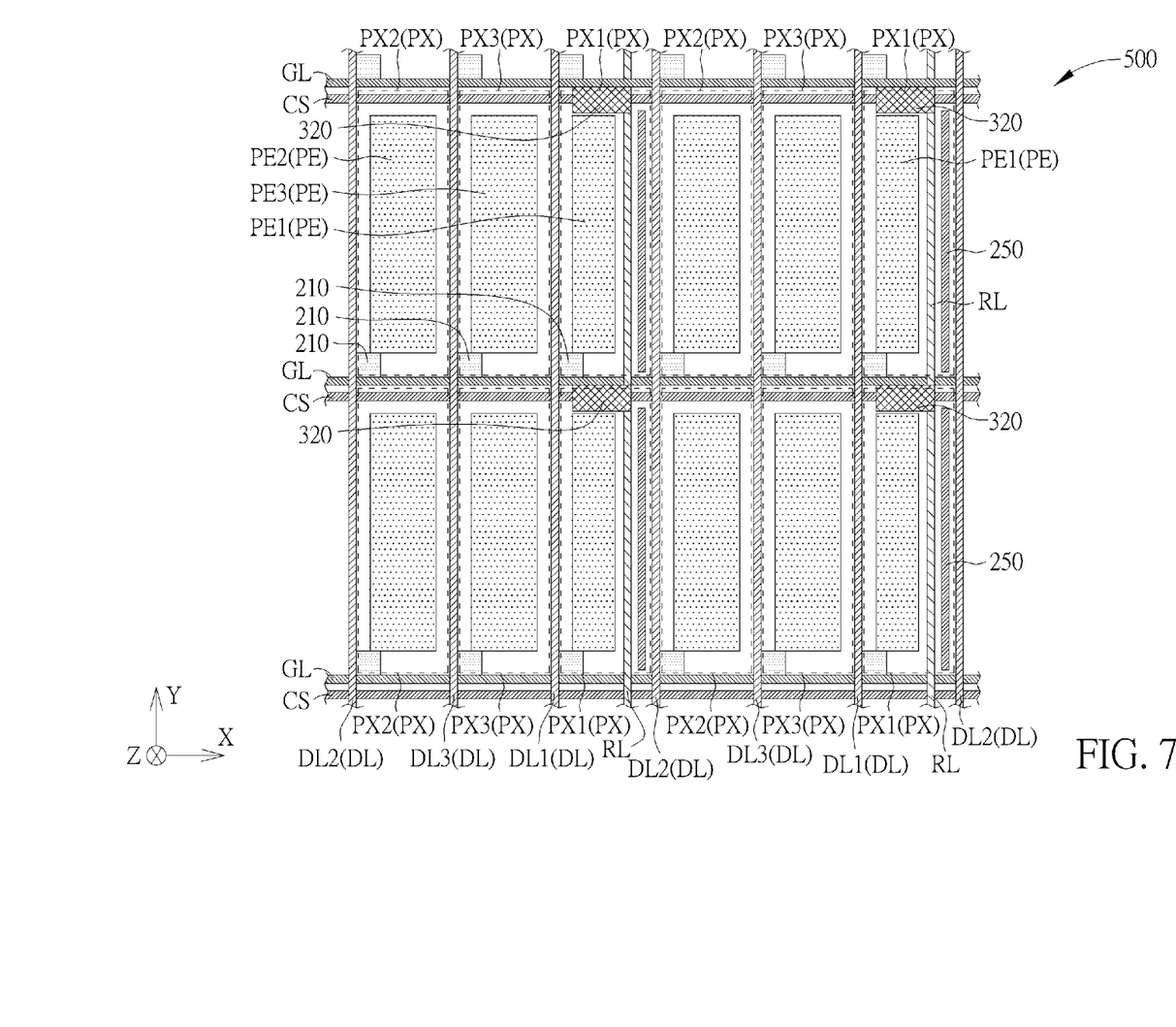
FIG. 7 is a schematic diagram illustrating a display driving circuit with photo detecting input according to a fourth preferred embodiment of the present invention.

Please refer to FIG. 7. FIG. 7 is a schematic diagram illustrating a display driving circuit 500 with photo detecting input according to a fourth preferred embodiment of the present invention. As shown in FIG. 7, the difference between the display driving circuit 500 in this embodiment and the display driving circuit in the third preferred embodiment is that the photo detecting unit 320 is electrically connected to one of the common lines CS. The detail characteristics of the photo detecting unit 320 have been described in the second preferred embodiment and will not be redundantly described.

To summarize the above descriptions, in the display driving circuit with the photo detecting input of the present invention, the isolation electrode is disposed between the readout line and the data line so as to reduce signal interference between the readout line and the data line, and purposes of enhancing accuracy of photo detecting signal judgment and lowering the processing loading of the related integrated circuits may be achieved accordingly. Additionally, the isolation electrode in the present invention may further be formed by the original manufacturing process of the gate lines, the common lines or the data lines. No additional manufacturing process is required to achieve the purpose of reducing signal interference between the readout line and the data line.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display driving circuit with photo detecting input, comprising:
    a plurality of pixel regions, arranged in a matrix configuration;
    a plurality of pixel electrodes, disposed in the pixel regions respectively;
    a plurality of gate lines, extending along a first direction and disposed parallel to one another;
    a plurality of data lines, extending along a second direction and disposed parallel to one another, wherein the gate lines cross the data lines;
    at least one photo detecting unit, disposed in at least one of the pixel regions;
    at least one readout line, electrically connected to the photo detecting unit, wherein the readout line is disposed between two adjacent data lines, the data lines comprise a first data line and a second data line disposed adjacently to each other, and none of the data lines is disposed between the first data line and the second data line, wherein the readout line is disposed between the first data line and the second data line, and a spacing between the first data line and the readout line is wider than a spacing between the second data line and the readout line; and
    at least one isolation electrode, disposed between the readout line and the second data line along the first direction, wherein the isolation electrode does not overlap the readout line, and the isolation electrode is an electrically floating electrode.

2. The display driving circuit of claim 1, further comprising a plurality of common lines extending along the first direction and disposed parallel to one another.

3. The display driving circuit of claim 2, wherein the photo detecting unit is electrically connected to one of the common line.

4. The display driving circuit of claim 1, wherein the photo detecting unit is electrically connected to one of the gate lines.

5. The display driving circuit of claim 1, further comprising a plurality of display switching devices disposed in the pixel regions respectively, wherein each of the display switching devices is electrically connected to one of the gate lines, one of the data lines and one of the pixel electrodes.

6. The display driving circuit of claim 1, wherein the readout line is perpendicular to the gate lines.

7. The display driving circuit of claim 1, wherein the photo detecting unit comprises a photo sensing device.

* * * * *